(12) United States Patent
Bowen et al.

(10) Patent No.: US 12,459,758 B2
(45) Date of Patent: Nov. 4, 2025

(54) METHODS AND SYSTEMS TO CONTROL PERCENT SOLIDS IN CONVEYANCE PIPE

(71) Applicant: SonDance Solutions LLC, Pinehurst, TX (US)

(72) Inventors: Jay C Bowen, Pinehurst, TX (US); Jeffery M Wilkinson, Spring, TX (US); Cris K Weber, Austin, TX (US); Stephen P Rowland, Magnolia, TX (US)

(73) Assignee: SonDance Solutions LLC, Pinehurst, TX (US)

( * ) Notice: Subject to any disclaimer, the term of this patent is extended or adjusted under 35 U.S.C. 154(b) by 707 days.

(21) Appl. No.: 17/652,253

(22) Filed: Feb. 23, 2022

(65) Prior Publication Data

US 2022/0267104 A1 Aug. 25, 2022

Related U.S. Application Data

(60) Provisional application No. 63/152,659, filed on Feb. 23, 2021.

(51) Int. Cl.
*B65G 53/30* (2006.01)
*B65G 53/48* (2006.01)
*B65G 53/66* (2006.01)

(52) U.S. Cl.
CPC ............. *B65G 53/30* (2013.01); *B65G 53/48* (2013.01); *B65G 53/66* (2013.01); *B65G 2203/025* (2013.01)

(58) Field of Classification Search
CPC ...................................... B65G 53/30

USPC ....................... 406/12, 14, 29, 30; 366/152.1
See application file for complete search history.

(56) References Cited

U.S. PATENT DOCUMENTS

| | | | | |
|---|---|---|---|---|
| 3,514,217 A | * | 5/1970 | Reiss | F17D 1/088 137/4 |
| 3,931,999 A | * | 1/1976 | McCain | B65G 53/30 406/60 |
| 3,940,184 A | | 2/1976 | McCain | |
| 4,231,686 A | * | 11/1980 | Sakamoto | B65G 53/30 406/14 |
| 4,586,852 A | * | 5/1986 | Oda | B65G 53/30 406/137 |
| 4,586,853 A | * | 5/1986 | Sweeney | B65G 53/30 406/103 |
| 4,824,285 A | * | 4/1989 | Trierweiler | E02B 3/04 405/15 |

(Continued)

OTHER PUBLICATIONS

Miedema, Sape A. and Ramsdell, Robert C., Hydraulic Transport of Sand/Shell Mixtures in Relation with the Critical Velocity, Terra et Aqua, Mar. 2011, pp. 18-27, No. 122.

(Continued)

*Primary Examiner* — David L Sorkin
(74) *Attorney, Agent, or Firm* — K&L Gates LLP (57) ABSTRACT

The present disclosure relates to methods and system for conveying a slurry which include a mixing tub configured to mix a solid and a liquid to form the slurry, a pump operable to pump the slurry through the conveyance line a distance to the placement site, and a control system operable to adjust a percent of solids of the slurry within the mixing tub based on at least one of a target pump rate or the distance to the placement site.

21 Claims, 2 Drawing Sheets

(56) References Cited

U.S. PATENT DOCUMENTS

| | | | |
|---|---|---|---|
| 2002/0048213 A1* | 4/2002 | Wilmer | B01F 35/2134 |
| | | | 366/136 |
| 2006/0221762 A1 | 10/2006 | Rondeau et al. | |
| 2008/0115462 A1* | 5/2008 | Doyle | B65B 3/24 |
| | | | 141/192 |
| 2010/0172202 A1 | 7/2010 | Borgstadt | |
| 2016/0288368 A1 | 10/2016 | Orban et al. | |
| 2017/0014877 A1 | 1/2017 | Hartley | |

OTHER PUBLICATIONS

International Search Report and Written Opinion dated Jun. 16, 2022 for corresponding PCT Application No. PCT/US2022/070800 filed Feb. 23, 2022.

\* cited by examiner

METHODS AND SYSTEMS TO CONTROL PERCENT SOLIDS IN CONVEYANCE PIPE

BACKGROUND

This section is intended to provide relevant background information to facilitate a better understanding of the various aspects of the described embodiments. Accordingly, these statements are to be read in this light and not as admissions of prior art.

Multiple industries both onshore and offshore utilize pipes for conveyance of materials. Current industry practice is to combine solids and fresh water or seawater as a slurry into a conveyance pipe. Conveyance pipes used for the transport of materials include the sewage, construction (environmental and civil), irrigation (farms/ranches), dredging, and mining industries and applications.

The following is a description of current industry practices in pumping slurries in conveyance pipe. Solids are removed from the source area mechanically or hydraulically. The types of solids during a project can be homogenous in density (constant) or heterogeneous in density (multiple types). A critical velocity is required when pumping a slurry in conveyance to avoid solids settling out of the slurry. These solids create costly clogs and operational shutdowns when they settle out of the slurry. When a project encounters multiple types of solids conveyed at different times, the critical velocity required for maintaining conveyance transport changes over time. Current practices allow the adjustment of horsepower and speed of the hydraulic pumps used in conveyance to compensate for changing critical velocities. This method of adjusting horsepower is a reactionary method based on the type of solids being pumped however and can be inefficient due to operating outside the pump manufacturer's operating envelope. Some examples of pump inefficiencies include cavitation, slippage, and breakdown. A project's operational inefficiencies create longer project times, incur costly shutdowns, and reduce profitability due to non-optimal solids concentrations in the slurry. For instance, current dredging industry practices operate with a slurry solids concentration of 15%-20% solids in the conveyance mixture. In addition, due to periods of time during the dredging process, where mostly water is pulled through the dredging intake, the daily operating average is 6%-7% slurry solids in the conveyance mixture.

The aforementioned current art of operational pump inefficiencies and of not actively controlling the slurry's mixture requires the need for costly multiple pump relay stations for long distance conveyance. For example, a project encountering multiple solids, such as sand and clay, require multiple pump relay stations that include more manpower, more fuel, more footprint, and thereby more costs. A project requiring more pieces of equipment has the greater chance of mechanical failure and costly downtime.

SUMMARY

Some embodiments disclosed herein are directed to a system for conveying a slurry including a solid and a liquid to a placement site through a conveyance line, where the system includes: a mixing tub configured to mix the solid and the liquid to form the slurry; a pump operable to pump the slurry through the conveyance line a distance to the placement site; and a control system operable to adjust a percent of solids of the slurry within the mixing tub based on at least one of a target pump rate or the distance to the placement site.

Additionally, some embodiments disclosed herein are directed to a method of conveying a slurry including a solid and a liquid to a placement site through a conveyance line. In some embodiments, the method includes: mixing the solid and the liquid in a mixing tub to form the slurry; pumping the slurry within a conveyance line with a pump to convey the slurry a distance to the placement site; and adjusting a percent of solids within the mixing tub based on at least one of a target pump rate or the distance to the placement site to maintain a critical velocity of the slurry in the conveyance line.

Still other embodiments disclosed herein are directed to a system for conveying a solid and liquid slurry to a placement site through a conveyance line. In some embodiments, the system includes a pump operable to pump the slurry through the conveyance line a distance to the placement site, and the slurry is combinable with the conveyance line downstream of the pump. In an embodiment, the system also includes a mixing tub configured to mix the solid and liquid slurry; a flow sensor operable to measure a flow rate of the slurry in the conveyance line; and a control system operable to adjust a percent of solids of the slurry within the mixing tub based on at least one of a target pump rate, the distance to the placement site, or the flow sensor to maintain a critical velocity of the slurry in the conveyance line.

Embodiments of the methods and equipment to control percent solids in conveyance pipe are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION

The described embodiments relate to methods and systems that convey a slurry including a solid and a liquid in a conveyance pipe in onshore and offshore operations.

This process utilizes a system that proactively controls the percent of solids, including solids having multiple critical velocities, prior to creating a slurry to be pumped in the conveyance such that optimum flowrates may be maintained and pumps may operate within efficient ranges. As a result of this control, a higher percentage of solids in the slurry being conveyed can be achieved compared to current industry practices because this system provides improved utilization of a conveyance pump's horsepower usage. In some embodiments, this system may deliver above 62% of solids in the slurry conveyance mixture. Thus, long distance conveyance will be more profitable due to not requiring multiple pump relay stations, thus not requiring additional manpower, fuel, and footprint. In addition, systems disclosed herein include slurries which do not pass through the pump or pumps, and may be beneficial to reduce pump wear and to reduce costly cleanouts when pumping contaminated solids.

This disclosure includes multiple configurations of controlling the amount of solids to be mixed in a slurry either upstream or downstream of the pump or pumps in both onshore and offshore conveyance.

Figure 1:
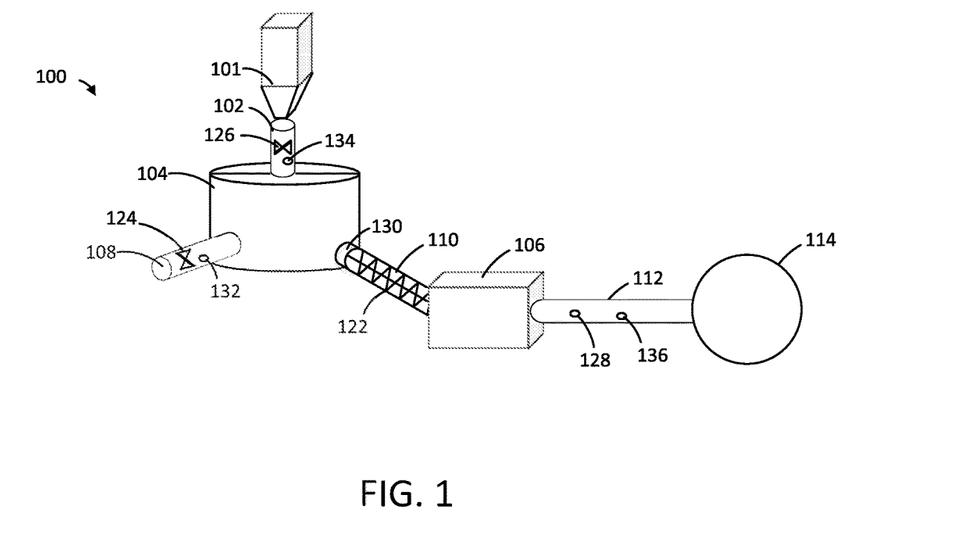
FIG. 1 is a schematic diagram of a system for conveying a slurry including a solid and a liquid to a placement site through a conveyance line, according to a first embodiment.

Referring to FIG. 1, a schematic diagram of a system 100 operable to convey a slurry in a conveyance pipe to a placement site 114 is shown. The system 100 comprises a mixing tub 104 with a solids inlet 102 which provides a passage to provide solids (e.g., sand, clay, sewage, silt, rocks, natural debris, man-made debris, or combinations thereof) and a liquids inlet 108 which provides a separate passage into the mixing tub 104 to provide liquid solutions (e.g., water, seawater, or combinations thereof). A hopper 101 is shown which may store a volume of solid material which may then be fed into the solids inlet 102, where a solids valve 126 may be used to selectively control for the amount of solids passed into the mixing tub 104. Alternatively, other methods may be used to control the amount of solids introduced into the mixing tub 104. For example, the hopper 101 and the valve 126 may be replaced with a conveyor belt (not shown but understood by those skilled in the art) which may be selectively controlled to feed solids into the solids inlet 102 and the mixing tub 104. Also in some embodiment a selectively driven auger (not shown but understood by those skilled in the art) may be used to in place of one or both of the hopper 101 and the solids valve 126. Additionally, the liquids inlet 108 may further include a liquids valve 124, which provides selective control for the amount of liquid passed into the mixing tub 104. During operations of the mixing tub 104, the solids from the inlet 102 and the liquid from the liquids inlet 108 are mixed to form a slurry before exiting the mixing tub 104 along a mixture line 110 to enter a pump 106 downstream of the mixing tub 104. Mixing elements within the mixing tub 104 (e.g., rotating members, ore crushing jaws, cams, rollers, etc.) may be used to mix the solids and liquids into a slurry and may operate to break the solids apart (e.g., breaking groups of clay into smaller groups, breaking shells, rocks, etc.) An auger 122 may also be included within the mixture line 110 in some embodiments to move the slurry into the pump 106, however the slurry may also be moved into the pump 106 with gravity, a pump upstream of the mixing tub 104, or a conveyor belt (not shown but understood by those skilled in the art). The operations of the mixing tub 104 and the transfer of the slurry to the pump 106 may be a continuous process or may be started and stopped as needed. A densitometer 130 may also be included along the slurry line 110 to monitor the density of the slurry passing therethrough. Additionally, the system 100 further comprises a conveyance line 112 downstream of the pump 106 and thus provides a path for the slurry between the pump 106 and a placement site 114. A flow sensor 128 and/or a pressure sensor 136 may also be included along the conveyance line 112 to measure a flowrate of the slurry between the pump 106 and the placement site 114. While only one flow sensor 128 and pressure sensor 136 is shown in FIG. 1, a plurality of flow sensors 128 and/or a plurality of pressure sensors 136 may be placed along the conveyance line 112 to monitor localized flows therein and to detect the particular locations of flow blockages or restrictions. In addition, a plurality of other pressure sensors may also be used on other portion of the system 100. For example, a pressure sensor 132 may be used to monitor the liquid pressure downstream of the liquids valve 124, and a pressure sensor 134 may be used to monitor the pressure of solids downstream of the solids valve 126.

Referring still to FIG. 1, during operations of the system 100, the solids provided into the solids inlet 102 of the mixing tub 104 may be primarily homogeneous materials or may be a mixture of two or more materials. The solids comprise many particles which may each have a particular density, size, and shape which can influence the particle's "critical velocity" when suspended within a slurry. Given a constant flow rate, the particles of denser materials and the particles having smaller aerodynamic drag profiles, both tend to separate from or "settle out of" a slurry before the particles having lower densities or higher aerodynamic drag profiles. Thus slurries having homogeneous solids tend to have a single critical velocity, while slurries having mixtures of solids with different properties tend to have more than one critical velocity. Accordingly, a target flow rate of the slurry transfer along the conveyance line 112 may account for a single critical velocity for slurries comprised of homogeneous materials, while the target flow rate for slurries comprising mixtures of solids with different properties may need to account for multiple critical velocities. In particular, the target flow rate within the conveyance line 112 may be set by according to the constituent solid with the highest critical velocity, so that separation can be avoided. In addition, the distance to the placement site also effects the flow rate of the slurry given that longer lengths of the conveyance line 112 result in higher pump 106 horsepower demands to account for pressure and flow losses within the conveyance line 112. In some embodiments, the target flow rate for a composition of slurry may need to be adjusted by the system 100 over time, when for example the types of solids change during operation of the pump 106. For example, in the dredging industry, the solids introduced into the mixing tub 104 are from a seabed, and thus may be composed of many different solid material types, shapes, and sizes depending on the local seabed terrain. In addition, the seabed composition even in the same general area may change compositions along a dredged length while the pump 106 remains in operation. Therefore, the system 100 is operable to control the amount of solids added in the slurry, while also adjusting to a new target critical velocity to match the particular type of solids introduced into the mixing tub 104 as the solids change over time.

The solids valve 126 may be any type of valve (e.g., a proportional valve, gate valve, ball valve, etc.) and may be adjustable between a fully open, fully closed, or a partially open position. In this manner a control system (such as controller 300 of FIG. 3) may be operable to control the flow of solids into the mixing tub 104. Similarly, the liquids valve 124 may also be any type of valve (e.g., a proportional valve, gate valve, ball valve, etc.) and may be adjustable between a fully open, fully closed, or a partially open position, such that a control system (such as controller 300 of FIG. 3) may be operable to control the flow of liquid into the mixing tub 104.

The embodiment of FIG. 1 shows the liquids inlet 108 positioned along a lower portion of the mixing tub 104, and thus below the level of the slurry within the mixing tub 108. The liquid provided from the liquids inlet 108 may be provided at a static pressure which is higher than the hydrostatic pressure of the slurry in the mixing tub 104, which is a function of slurry density and depth, thus allowing liquid flow into the mixing tub 104. In addition, in some embodiments, the liquids valve 124 may be configured to flow liquid into the mixing tub 104 to increase a static pressure within the mixing tub 104, such that the static pressure and the hydrostatic pressure of the slurry flow the slurry through the slurry line 110 and into the pump 106.

In some embodiments, the liquid inlet 108 may alternatively be positioned along a higher portion of the mixing tub 104 which is above the level of the slurry. In this manner, liquid provided from the liquid inlet 108 may be provided into the mixing tub 104 at a pressure which is lower than the hydrostatic pressure of the slurry in the mixing tub 104.

During operations of the system 100, the percent of solids within the slurry may be proactively adjusted based on target pump rates and the distance to the placement site. In some embodiments, the system 100 may be operable to monitor a flow rate of the slurry transfer and make adjustments to the percent of solids within the slurry to maintain a minimum flow rate above the slurry critical velocity, as measured by the flow sensor 128, while maintaining a constant horsepower output at the pump. In addition, by controlling the percent of solids within the slurry, the target flow rate can be selected which is within pump's 106 optimal horsepower range. To do so, the percent of solids within the mixing tub 104 may be controlled by adjusting at least one of the liquids valve 124 or the solids valve 126 to control the percent of solids in the slurry within the mixing tub 104. In particular, the control system 300 (FIG. 3) may monitor the flow rate of the slurry in the conveyance 112 with the flow sensor 128 and the percent of solids within the mixing tub 104 may be controlled by adjusting at least one of the liquids valve 124 or the solids valve 126 so as to maintain a minimum flow rate therein. For example, if the flow sensor 128 measures a reduced flow rate, while the pump 106 remains at a constant horsepower output, the slurry may have too high a percentage of solids. The slurry in the mixing tub 104 may be thinned by operating the liquids valve 124 to add liquid, thus reducing the percent of solids in the slurry. In addition, or alternatively, the slurry may be thinned by operating the solids valve 126 to reduce the flow of solids from the hopper 101 into the mixing tub 104, again reducing the percent of solids in the slurry. Similarly, if the flow sensor 128 measures an increased flow rate, while the pump 106 remains at a constant horsepower output, the slurry may have too low a percentage of solids. Such a conveyance of mostly liquid is inefficient in many applications where the overall goal of the slurry transfer is to move solids from one location to another. In addition, high flow rates within the conveyance line 112 can lead to additional flow and pressure related losses, which are related to the flow velocity squared. Accordingly, operating the conveyance line 112 at flow rates exceeding the minimum critical velocity of the slurry may be energy inefficient for the pump 106. In these instances, where the slurry is too thin, the slurry in the mixing tub 104 may be thickened by operating the liquids valve 124 to reduce the flow of liquids into the mixing tub 104, thus increasing the percent of solids in the slurry. In addition, or alternatively, the slurry may be thickened by operating the solids valve 126 to increase the flow of solids from the hopper 101 into the mixing tub 104, again increasing the percent of solids in the slurry.

As described, the slurries critical velocity is a factor which may be used to set the minimum target flow rate in the conveyance line 112 prospectively, however the composition of the solids within the slurry may also change over time (for example, as described for dredging applications) and thus the target critical velocity of the system 100 may also be established and changed over time using measurements from the densitometer 130. Thus, the control system 300 (FIG. 3) may also use the densitometer 130 together with the flow sensor 128 to monitor the flow of the slurry in the conveyance line 112 while adjusting the percent of solids by adjusting at least one of the liquids valve 124 or the solids valve 126 so as to maintain a minimum flow rate therein. For example, the control system 300 and the flow sensor 128 may measure a flowrate which exceeds the current target minimum critical velocity of the slurry, which in the previous example indicated a slurry which was too thin and which thus needed an increased percent of solids to provide optimal flow within the conveyance line 112. However, the control system 300 may additionally calculate a new target critical velocity using measurements from the densitometer 130, and thus may adjust the percent of solids by a different amount, or may not adjust the percent of solids at all. (For example, when the new composition of solids has a higher critical velocity to avoid separation of the slurry.) Similarly, the densitometer 130 may also adjust the target flow rate when the flow sensor 128 measures a reduced flow rate in the conveyance line 112. Additionally, in some embodiments, the flow sensor 128 may not be used and the control system 300 may use the densitometer 130 and measurements from other sensors (such as pressure sensors 136). In this manner, in some embodiments, the minimum flow rate may be maintained while maintaining a constant horsepower output at the pump 106. The control system 300 may thus control the operation of the system 100 to allow flow control when using slurries having solids with one critical velocity or when using slurries having solids with multiple critical velocities. Initial pumping rate targets for the pump 106 and target flowrates within the conveyance line 112 may be set within the control system 300 based on premeasured characteristics of the slurry (e.g., physical sizes and/or densities of the solids, percent solids within the mixing tube, viscosity measurements within the mixing tub, etc.). The control system 300 may also be used to calculate and adjust to an optimum percentage of solids within the slurry by monitoring the flow rate within the conveyance line 112 with the flow sensor 128, by monitoring the densitometer 130, and by using Proportional, Integral, Differential control (herein, "PID control") to adjust at least one of the liquids valve 124 or the solids valve 126, to vary the percent of solids within the slurry. The optimum percentage of solids within the slurry is based on the conveyance line 112 inner diameter, length, burst rating, and corresponding friction pressures based on varying flow rates and percent solids. These parameters may be calculated prospectively for optimal pumping efficiency and may be used to set operational limits for the control system 300.

Figure 2:
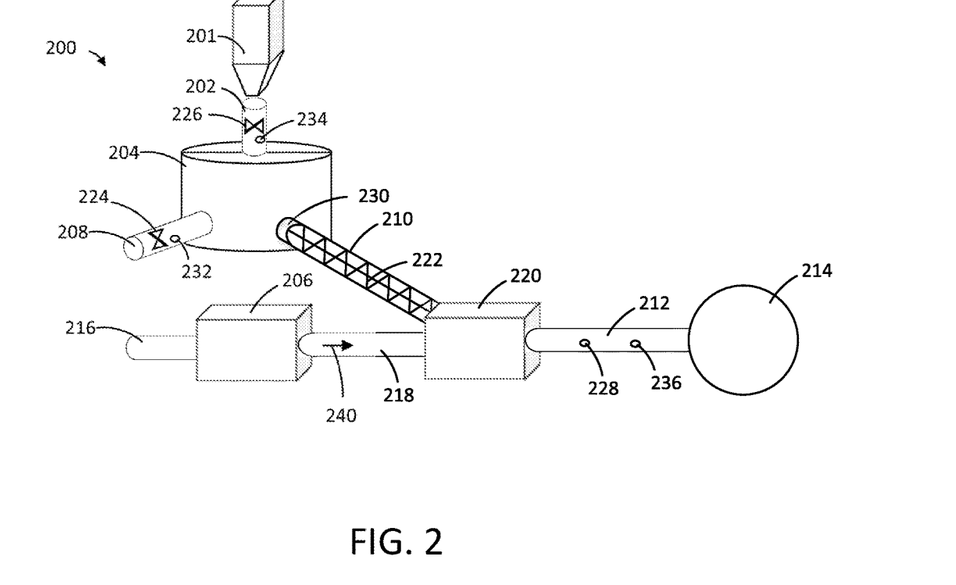
FIG. 2 is a schematic diagram of a system for conveying a slurry including a solid and a liquid to a placement site through a conveyance line, according to a second embodiment.

Referring to FIG. 2, another embodiment of a system 200 is shown. Some systems or components of the system 200 are similar to the systems or components of the system 100, so similar reference numerals are used, the operational description is not repeated in the interest of brevity, and the description will focus on features which are different in the system 200. In particular, the system 200 comprises a solids inlet 202 which provides a passage to provide solids (e.g., such as sand, clay, sewage, silt, rocks, natural debris, man-made debris, or combinations thereof) into a mixing tub 204, and a liquids inlet 208 which provides a separate passage for liquid into the mixing tub 204. A hopper 201 is shown which may store a volume of solid material which may then be fed into the solids inlet 202, where a solids valve 226 may be used to selectively control for the amount of solids passed into the mixing tub 204. Alternatively, other methods may be used to control the amount of solids introduced into the mixing tub 204. For example, the hopper 201 and the valve 226 may be replaced with a conveyor belt (not shown) which may be selectively controlled to feed solids into the solids inlet 202 and the mixing tub 204. Also in some embodiment a selectively driven auger (not shown) may be used to in place of one or both of the hopper 201 and the solids valve 226. Additionally, the liquids inlet 108 further includes a liquids valve 224, which provides selective control for the amount of liquid passed into the mixing tub 204. During operations of the system 200, the solids from the solids inlet 202 and the liquid from the liquids inlet 208 are mixed in the mixing tub 204 to form a slurry. The slurry exits the mixing tub 204 along a mixture line 210 to enter a flow injection manifold 220, which is downstream from a pump 206. Mixing elements within the mixing tub 204 (e.g., rotating members, ore crushing jaws, cams, rollers, etc.) may be used to mix the solids and liquids into a slurry and may operate to break the solids apart (e.g., breaking groups of clay into smaller groups, breaking shells, rocks, etc.) An auger 222 may be included within the mixture line 210 in some embodiments to move the slurry into the flow injection manifold 220, however the slurry may also be moved within mixture line 210 by gravity, a pump upstream of the mixing tub 204, or a conveyor belt (not shown). The pump 206 receives liquid along a pump inlet 216, which is pressurized within the pump 206 and then provides a liquid flow 240 from a pump outlet 218 into the flow injection manifold. In this manner, the slurry from the mixing tub 204 does not pass through the pump 206. The operations of the mixing tub 204, the transfer of the slurry to the flow injection manifold 220, and the operation of the pump 206 may be a continuous process or may be started and stopped as needed. A densitometer 230 may also be included along the slurry line 210 to monitor the density of the slurry passing therethrough. Additionally, the system 200 further comprises a conveyance line 212 downstream of the flow injection manifold 220 and thus provides a path for the slurry between the flow injection manifold 220 and a placement site 214. A flow sensor 228 and/or a pressure sensor 236 may also be included along the conveyance line 212 to measure the flowrate of the slurry within the conveyance line 212. While only one flow sensor 228 and pressure sensor 236 is shown in FIG. 2, a plurality of flow sensors 228 and/or a plurality of pressure sensors 236 may be placed along the conveyance line 212 to measure localized flows therein and to detect the particular locations of flow blockages or restrictions. In addition, a plurality of other pressure sensors may also be used on other portion of the system 200. For example, a pressure sensor 232 may be used to monitor the liquid pressure downstream of the liquids valve 224, and a pressure sensor 234 may be used to monitor the pressure of solids downstream of the solids valve 226.

Referring still to FIG. 2, during operations of the system 200, the solids provided into the solids inlet 202 of the mixing tub 204 may have a single critical velocity or may have multiple critical velocities, as described previously for the system 100, and the percent of solids within the slurry may be adjusted to provide optimal flow within conveyance line 212. Also, as described previously for the system 100, the system 200 may provide a continuously updating target flow rate to adjust for changing compositions of solids within the slurry. Such embodiments may be useful for example in the dredging industry where the types of solids added to the mixing tub 204 are not controllable, but rather depend on the specific and potentially changing composition of the sea bed. In this manner, the system 200 may be operable to continuously control the amount of solids added in the slurry, while also adjusting to a new target critical velocity to match the particular type of solids introduced into the mixing tub 204. In addition, the pump 206 provides a separate liquid flow 240 into the flow injection manifold 220 such that the slurry does not enter the pump 206.

Solids valve 226 may be any type of valve (e.g., a proportional valve, gate valve, ball valve, etc.) and may be adjustable between a fully open, fully closed, or a partially open position. In this manner a control system (such as controller 300 of FIG. 3) may be operable to control the flow of solids into the mixing tub 204. Similarly, the liquids valve 224 may also be any type of valve (e.g., a proportional valve, gate valve, ball valve, etc.) and may be adjustable between a fully open, fully closed, or a partially open position, such that the control system (such as controller 300 of FIG. 3) may be operable to control the flow of liquid into the mixing tub 204. The embodiment of FIG. 2 may also allow for the liquid from liquids inlet 208 to be provided at a static pressure which is higher than the hydrostatic pressure of the slurry. In addition, the liquids inlet 208 may be configured to increase a static pressure within the mixing tub 204, which may be used to flow the slurry through the mixture line 210 and into the flow injection manifold 220. In some embodiments, the liquids inlet 208 may alternatively be positioned so that the liquid provided from the liquids inlet 208 may be at a lower pressure than the hydrostatic pressure of the slurry exiting the mixing tub 204 through the slurry line 210.

During operations of the system 200, the percent of solids within the mixing tub 204 may be controlled by adjustably choking at least one of the liquids valve 224 or the solids valve 226 upstream from the mixing tub 204 to control the percent of solids in the slurry within the mixing tub 204. In particular, the control system 300 (FIG. 3) may monitor the flow rate of the slurry with the flow sensor 228 and the percent of solids within the mixing tub 204 may be controlled by adjustably choking at least one of the liquids valve 224 or the solids valve 226 to maintain a minimum flow rate therein. For example, if the flow sensor 228 measures a reduced flow rate, while the pump 206 remains at a constant horsepower output, the slurry may have too high a percentage of solids. The slurry in the mixing tub 204 may be thinned by operating the liquids valve 224 to add liquid, thus reducing the percent of solids in the slurry. In addition, or alternatively, the slurry may be thinned by operating the solids valve 226 to reduce the flow of solids from the hopper 201 into the mixing tub 204, again reducing the percent of solids in the slurry. Similarly, if the flow sensor 228 measures an increased flow rate, while the pump 206 remains at a constant horsepower output, the slurry may have too low a percentage of solids. Such a conveyance of mostly liquid is inefficient in many applications where the overall goal of the slurry transfer is to move solids from one location to another. In addition, high flow rates within the conveyance line 212 can lead to additional flow and pressure related losses, which are related to the flow velocity squared. Accordingly, operating the conveyance line 212 at flow rates exceeding the minimum critical velocity of the slurry may be energy inefficient for the pump 206. In these instances, where the slurry is too thin, the slurry in the mixing tub 204 may be thickened by operating the liquids valve 224 to reduce the flow of liquids into the mixing tub 204, thus increasing the percent of solids in the slurry. In addition, or alternatively, the slurry may be thickened by operating the solids valve 226 to increase the flow of solids from the hopper 201 into the mixing tub 204, again increasing the percent of solids in the slurry.

As described, the slurries critical velocity is a factor which may be used to set the minimum target flow rate in the conveyance line 212 prospectively, however the composition of the solids within the slurry may also change over time (for example, as described for dredging applications) and thus the target critical velocity of the system 200 may also be established and changed over time using measurements from the densitometer 230. Thus, the control system 300 (FIG. 3) may also use the densitometer 230 together with the flow sensor 228 to monitor the flow of the slurry in the conveyance line 212 while adjusting the percent of solids by adjusting at least one of the liquids valve 224 or the solids valve 226 so as to maintain a minimum flow rate therein. For example, the control system 300 and the flow sensor 228 may measure a flowrate which exceeds the current target minimum critical velocity of the slurry, which in the previous example indicated a slurry which was too thin and which thus needed an increased percent of solids to provide optimal flow within the conveyance line 212. However, the control system 300 may additionally calculate a new target critical velocity using measurements from the densitometer 230, and thus may adjust the percent of solids by a different amount, or may not adjust the percent of solids at all. (For example, when the new composition of solids has a higher critical velocity to avoid separation of the slurry.) Similarly, the densitometer 230 may also adjust the target flow rate when the flow sensor 228 measures a reduced flow rate in the conveyance line 212. Additionally, in some embodiments, the flow sensor 228 may not be used and the control system 300 may use the densitometer 230 and measurements from other sensors (such as pressure sensors 236).

Figure 3:
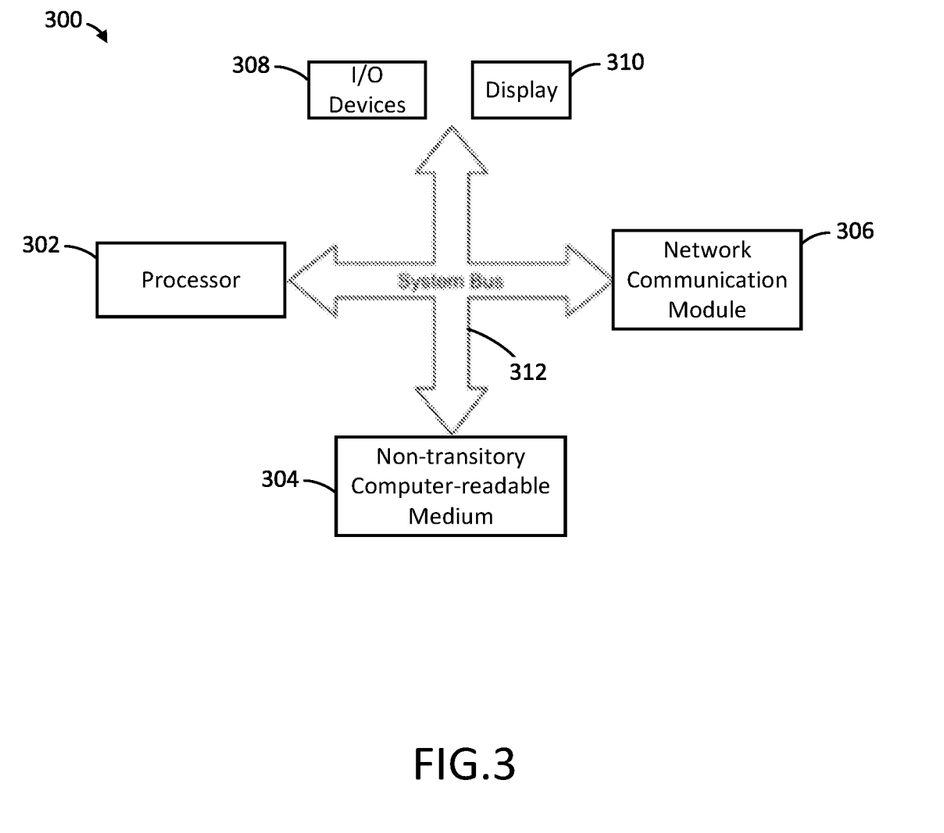
FIG. 3 is a block diagram of a controller for use with a system for conveying a slurry including a solid and a liquid to a placement site through a conveyance line, according to one or more embodiments.

In this manner, in some embodiments, the minimum flow rate may be maintained with this control method while maintaining a constant horsepower output at the pump 206. Control system 300 may thus allow flow control when using slurries having solids with one critical velocity or when using slurries having solids with multiple critical velocities. Initial pumping rate targets for the pump 206 and target flowrates within the conveyance line 212 may be set within the control system 300 based on premeasured characteristics of the slurry (e.g., physical sizes and/or densities of the solids, percent solids within the mixing tube, viscosity measurements within the mixing tub, etc.). The control system 300 may also be used to calculate and adjust to an optimum percentage of solids within the slurry by monitoring the flow rate within the conveyance line 212 with the flow sensor 228, PID control to adjustably choke at least one of the liquids valve 224 or the solids valve 226, to vary the percent of solids within the slurry. The optimum percentage of solids within the slurry is based on the conveyance 112 inner diameter, length, burst rating, and corresponding friction pressures based on varying flow rates and percent solids. These parameters may be calculated prospectively for optimal pumping efficiency and may be used to set operational limits for the control system 300.

Certain terms are used throughout the description and claims to refer to particular features or components. As one skilled in the art will appreciate, different persons may refer to the same feature or component by different names. This document does not intend to distinguish between components or features that differ in name but not function.

Referring to FIG. 3, the equipment of the systems 100, 200 may be controlled by a controller 300 in the manner previously described. Controller 300 may be realized by, for example, a computer with a control calculation device and a storage device. For the control calculation device, a processor such as a CPU or a GPU may be used. The control calculation device reads a program that is stored in the storage device and performs a predetermined image processing operation and a computing processing operation in accordance with the program. Further, the control calculation device writes a calculated result to the storage device and reads information stored in the storage device in accordance with the program. However, the main controller may be formed by using an integrated circuit (IC) that can perform control similar to the control that is performed by using a CPU and a memory. Here, IC includes, for example, LSI (large-scale integrated circuit), ASIC (application-specific integrated circuit), a gate array, and FPGA (field programmable gate array).

The controller 300 includes at least one processor 302, a non-transitory computer readable medium 304, an optional network communication module 306, optional input/output devices 308, a data storage drive or device, and an optional display 310 all interconnected via a system bus 312. In at least one embodiment, the input/output device 308 and the display 310 may be combined into a single device, such as a touch-screen display. Software instructions executable by the processor 302 for implementing software instructions stored within the controller 300 in accordance with the illustrative embodiments described herein, may be stored in the non-transitory computer readable medium 304 or some other non-transitory computer-readable medium.

Control system 300 may continuously monitor the flow rate of the slurry with flow sensors 128, 228 and the percent of solids within the mixing tubs 104, 204 may be controlled by adjustably choking at least one of the liquids valves 124, 224 or the solids valve 126, 226 to maintain a minimum flow rate or a target flow rate therein. In this manner, the minimum flow rate or the target flow rate may be maintained within the conveyance line 112, 212, while maintaining a constant horsepower output at the pump 106, 206. Further, the controller 300 may also activate output devices such as audible alarm and a visual alarm when the pumps 106, 206 are operating outside of optimal horsepower ranges or may display the percent of solids within the slurry. The alarms may be activated on the display 310, for example. The alarms may also be remote from the systems 100, 200 with the controller 300 communicating remotely with the alarms through a network connection.

The controller 300 may be realized by, for example, a computer. The computer that constitutes the controller 300 may include a control calculation device and a storage device. For the control calculation device, a processor such as a CPU or a GPU may be used. The control calculation device reads a program that is stored in the data storage device and performs a predetermined computing processing operation in accordance with the program. Further, the control calculation device writes a calculated result to the storage device and reads information stored in the storage device in accordance with the program. Alternatively, the controller 300 may be formed by using an integrated circuit (IC) that can perform control similar to the control that is performed by using a CPU. Here, IC includes, for example, LSI (large-scale integrated circuit), ASIC (application-specific integrated circuit), a gate array, and FPGA (field programmable gate array).

Although not explicitly shown in FIG. 3, it should be recognized that the controller 300 may be connected to one or more public and/or private networks via appropriate network connections. It will also be recognized that software instructions may also be loaded into the non-transitory computer readable medium 304 from an appropriate storage media or via wired or wireless means.

While compositions and methods are described herein in terms of "comprising" various components or steps, the compositions and methods can also "consist essentially of" or "consist of" the various components and steps.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques accepted by those skilled in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

The following examples are illustrative embodiments in accordance with various aspects of the present disclosure.

A system for conveying a slurry including a solid and a liquid to a placement site through a conveyance line, the system including: a mixing tub configured to mix the solid and the liquid to form the slurry; a pump operable to pump the slurry through the conveyance line a distance to the placement site; and a control system operable to adjust a percent of solids of the slurry within the mixing tub based on at least one of a target pump rate or the distance to the placement site.

The system of any of the prior examples, wherein the slurry includes multiple solids of multiple critical velocities.

The system of any of the prior examples, further including a densitometer operable to measure at least one of a particle size or a density of the slurry and wherein the control system is operable to calculate a target flowrate for the slurry in the conveyance line based on the densitometer measurements.

The system of any of the prior examples, further including a liquids valve upstream from the mixing tub, wherein the liquids valve is operable to flow liquid into the mixing tub and increase a static pressure within the mixing tub such that the slurry in the mixing tub flows to the pump.

The system of any of the prior examples, wherein the control system is operable to adjust the percent of solids within the mixing tub to maintain a critical velocity of the slurry in the conveyance line.

The system of any of the prior examples, further including a flow sensor operable to measure a flow rate of the slurry in the conveyance line and wherein the control system is operable to adjust the percent of solids within the mixing tub to maintain a minimum flow rate of the slurry as measured by the flow sensor while maintaining a constant horsepower output at the pump.

The system of any of the prior examples, wherein the control system is operable to adjust the percent of solids in the mixing tub by adjusting at least one of a liquids or solids input into the mixing tub.

The system of any of the prior examples, further including a flow injection manifold in fluid communication with the mixing tub and the pump such that slurry from the mixing tub is combinable downstream of the pump with a separate liquid flow from the pump.

The system of any of the prior examples, further including an auger operable to feed the slurry into the flow injection manifold.

A method of conveying a slurry including a solid and a liquid to a placement site through a conveyance line, the method including: mixing the solid and the liquid in a mixing tub to form the slurry; pumping the slurry within a conveyance line with a pump to convey the slurry a distance to the placement site; and adjusting a percent of solids within the mixing tub based on at least one of a target pump rate or the distance to the placement site to maintain a critical velocity of the slurry in the conveyance line.

The method of any of the prior examples, further including: measuring a flow rate of the slurry within the conveyance line with a flow sensor; and adjusting the percent of solids within the mixing tub based on the measured flow rate of the slurry.

The method of any of the prior examples, wherein the mixing of the slurry includes mixing solids of multiple critical velocities.

The method of any of the prior examples, further including operating a liquids valve upstream from the mixing tub to increase a static pressure within the mixing tub such that the slurry in the mixing tub flows to the pump.

The method of any of the prior examples, further including combining the slurry in a flow injection manifold downstream of the pump.

The method of any of the prior examples, further including flowing the slurry with an auger into the flow injection manifold.

The method of any of the prior examples, wherein the adjusting the percent of solids includes adjusting at least one of a liquids valve or a solids valve upstream from the mixing tub.

The method of any of the prior examples, further including: measuring at least one of a particle size or a density of the slurry with a densitometer; and adjusting a flow rate of the slurry within the conveyance line based on the densitometer measurements.

A system for conveying a solid and liquid slurry to a placement site through a conveyance line, the system including: a pump operable to pump the slurry through the conveyance line a distance to the placement site, wherein the slurry is combinable with the conveyance line downstream of the pump. The system also including a mixing tub configured to mix the solid and liquid slurry; a flow sensor operable to measure a flow rate of the slurry in the conveyance line; and a control system operable to adjust a percent of solids of the slurry within the mixing tub based on at least one of a target pump rate, the distance to the placement site, or the flow sensor to maintain a critical velocity of the slurry in the conveyance line.

The system of any of the prior examples, wherein a liquids valve is configurable to increase a static pressure within the mixing tub such that the slurry is fed into the pump.

The system of any of the prior examples, further including a flow injection manifold configured to combine the slurry from the conveyance line with a separate water flow from the pump.

The system of any of the prior examples, wherein an auger is used to feed the solid and liquid slurry into the flow injection manifold.

What is claimed is:

1. A system for conveying a slurry including a solid and a liquid to a placement site through a conveyance line, the system comprising:
    a mixing tub configured to mix the solid and the liquid to form the slurry;
    a pump operable to pump the slurry through the conveyance line a distance to the placement site; and
    a control system operable to set a minimum flow rate in the conveyance line to maintain a critical velocity of the slurry based on a characteristic of the slurry and adjust a percent of solids of the slurry within the mixing tub based on at least one of a target pump rate or the distance to the placement site to maintain the minimum flow rate.

2. The system of claim 1, wherein the slurry comprises multiple solids of multiple critical velocities.

3. The system of claim 1, further comprising a densitometer operable to measure at least one of a particle size or a density of the slurry and wherein the control system is operable to calculate a new minimum flowrate for the slurry in the conveyance line based on the densitometer measurements.

4. The system of claim 1, further comprising a liquids valve upstream from the mixing tub, wherein the liquids valve is operable to flow liquid into the mixing tub and increase a static pressure within the mixing tub such that the slurry in the mixing tub flows to the pump.

5. The system of claim 1, wherein the control system is operable to adjust the percent of solids within the mixing tub to maintain the critical velocity of the slurry in the conveyance line.

6. The system of claim 1, further comprising a flow sensor operable to measure a flow rate of the slurry in the conveyance line and wherein the control system is operable to adjust the percent of solids within the mixing tub to maintain the minimum flow rate of the slurry as measured by the flow sensor while maintaining a constant horsepower output at the pump.

7. The system of claim 6, wherein the control system is operable to adjust the percent of solids in the mixing tub by adjusting at least one of a liquids or solids input into the mixing tub.

8. The system of claim 1, further comprising a flow injection manifold in fluid communication with the mixing tub and the pump such that the slurry from the mixing tub is combinable downstream of the pump with a separate liquid flow from the pump, and the slurry from the mixing tub does not pass through the pump.

9. The system of claim 8, further comprising an auger operable to feed the slurry into the flow injection manifold.

10. A method of conveying a slurry including a solid and a liquid to a placement site through a conveyance line, the method comprising:
    mixing the solid and the liquid in a mixing tub to form the slurry;
    pumping the slurry within a conveyance line with a pump to convey the slurry a distance to the placement site;
    setting, using a control system, a minimum flow rate in the conveyance line to maintain a critical velocity of the slurry based on a characteristic of the slurry; and
    adjusting, using the control system, a percent of solids of the slurry within the mixing tub based on at least one of a target pump rate or the distance to the placement site to maintain the minimum flow rate.

11. The method of claim 10, further comprising:
    measuring a flow rate of the slurry within the conveyance line with a flow sensor; and
    adjusting the percent of solids within the mixing tub based on the measured flow rate of the slurry.

12. The method of claim 10, wherein the mixing of the slurry comprises mixing solids of multiple critical velocities.

13. The method of claim 10, further comprising operating a liquids valve upstream from the mixing tub to flow liquid into the mixing tub and increase a static pressure within the mixing tub such that the slurry in the mixing tub flows to the pump.

14. The method of claim 10, further comprising combining the slurry in a flow injection manifold downstream of the pump such that the slurry from the mixing tub does not pass through the pump.

15. The method of claim 14, further comprising flowing the slurry with an auger into the flow injection manifold.

16. The method of claim 10, wherein the adjusting the percent of solids comprises adjusting at least one of a liquids valve or a solids valve upstream from the mixing tub.

17. The method of claim 16, further comprising:
    measuring at least one of a particle size or a density of the slurry with a densitometer; and
    adjusting a flow rate of the slurry within the conveyance line based on the densitometer measurements.

18. A system for conveying a solid and liquid slurry to a placement site through a conveyance line, the system comprising:
    a pump operable to pump the slurry through the conveyance line a distance to the placement site, wherein the slurry is combinable with the conveyance line downstream of the pump;
    a mixing tub configured to mix the solid and liquid slurry;
    a flow sensor operable to measure a flow rate of the slurry in the conveyance line; and
    a control system operable to set a minimum flow rate in the conveyance line to maintain a critical velocity of the slurry based on a characteristic of the slurry and adjust a percent of solids of the slurry within the mixing tub based on at least one of a target pump rate, the distance to the placement site, or the flow sensor to maintain the minimum flow rate.

19. The system of claim 18, wherein a liquids valve is operable to flow liquid into the mixing tub and increase a static pressure within the mixing tub such that the slurry in the mixing tub flows to the pump.

20. The system of claim 19, further comprising a flow injection manifold configured to combine the slurry from the conveyance line with a separate water flow from the pump such that the slurry from the mixing tub does not pass through the pump.

21. The system of claim 20, wherein an auger is used to feed the solid and liquid slurry into the flow injection manifold.

* * * * *